United States Patent [19]

Tink

[11] 3,711,777

[45] Jan. 16, 1973

[54] LATCHING AND CONTROL CIRCUIT FOR CARRIER DETECTION

[75] Inventor: Robert M. Tink, San Diego, Calif.

[73] Assignee: The National Cash Register Company, Dayton, Ohio

[22] Filed: Sept. 16, 1971

[21] Appl. No.: 181,166

[52] U.S. Cl. ......................325/320, 178/88, 325/64, 325/478, 328/150

[51] Int. Cl. ..............................................H04l 27/14

[58] Field of Search ..178/88; 325/64, 320, 322, 323, 325/364, 478; 340/171 R, 172; 328/139, 140, 150, 151; 329/178

[56] References Cited

UNITED STATES PATENTS 3,628,058 12/1971 Espe ................................328/151 X 3,654,555 4/1972 Ryan et al. ..........................325/478

*Primary Examiner*—Benedict V. Safourek

*Attorney*—Jay T. Cavender et al.

[57] ABSTRACT

A carrier detection circuit for a modem receiver wherein a carrier detect flip-flop is latched upon receipt of initial mark signals of a message. Logic circuits responsive to end-of-transmission signals, noise and signal drop-out control turn-off of the flip-flop. Probability of turn-off due to noise is reduced by delaying turn-off signals due to noise, whereby only a message end code causes rapid turn-off. In addition, a circuit is provided requiring the received signal be in a marking state to enable a fast turn-off.

11 Claims, 1 Drawing Figure

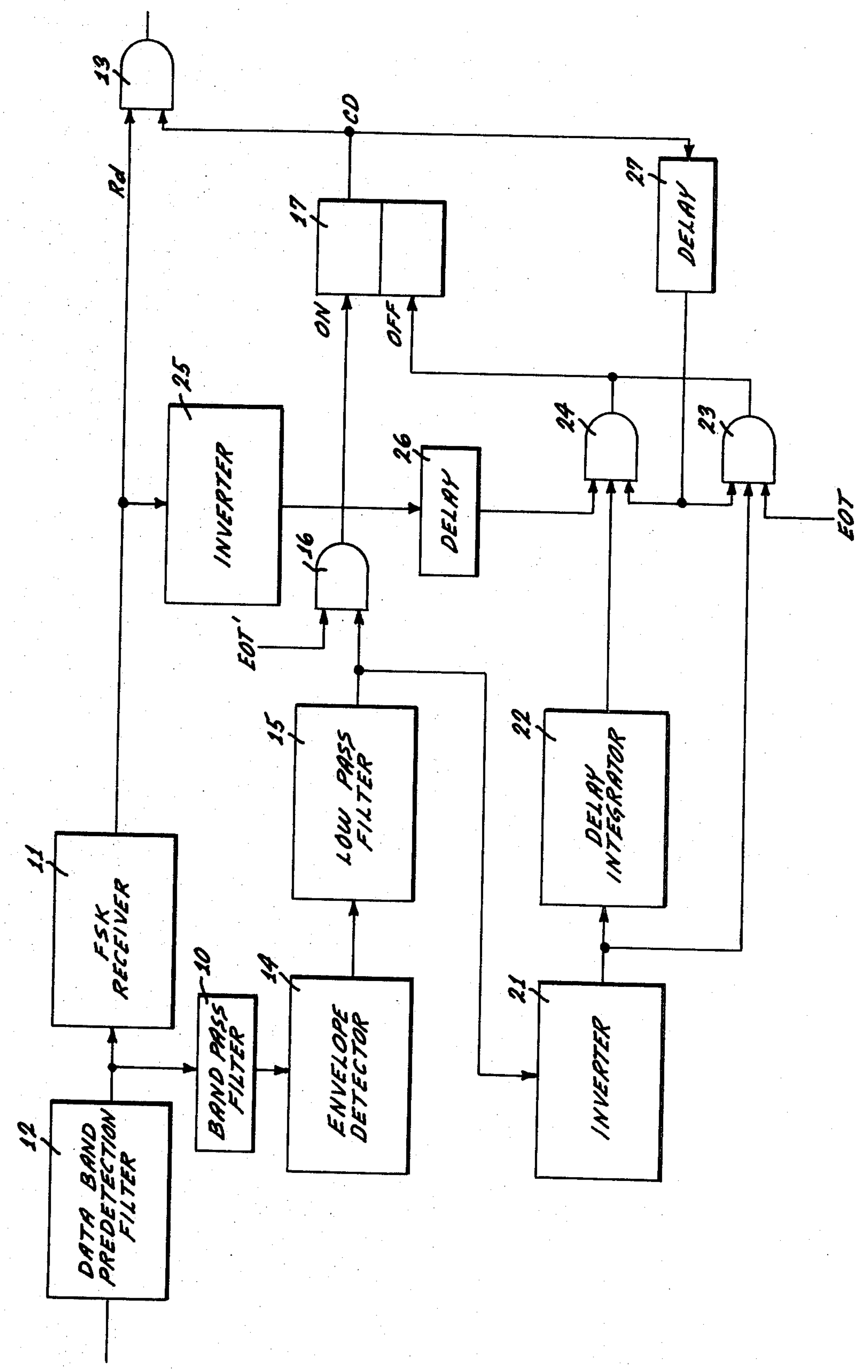
DATA BAND PREDETECTION FILTER
FSK RECEIVER
BAND PASS FILTER
ENVELOPE DETECTOR
LOW PASS FILTER
INVERTER
DELAY INTEGRATOR
INVERTER
DELAY
DELAY
ON
OFF
CD
Rd
EOT'
EOT
10
11
12
13
14
15
16
17
21
22
23
24
25
26
27

LATCHING AND CONTROL CIRCUIT FOR CARRIER DETECTION

SUMMARY OF THE INVENTION

The present invention is directed toward digital data transmission systems employing conventional telephone voice transmission facilities. More particularly, the present invention is directed to a circuit to be employed in connection with a conventional frequency shift keying receiver for swiftly detecting the presence of a data transmission carrier, providing a turn-on signal, and preventing a spurious turn-off signal caused by short bursts of noise while providing a turn-off signal upon the receipt of an end-of-transmission code where speed of turn-off is essential.

A computer and its peripheral devices connect into the ordinary voice wire communication system by means of a transmission control unit, a terminal for generating outgoing information and/or receiving incoming information, and a device for conditioning the signal for transmission over the communications facilities and conditioning an incoming message for acceptance by the terminal. The equipment that conditions the incoming and outgoing signals is known by a variety of terms. It has been called a line adapter, a data set, a modulator, or, as here, a modem, since the device modulates and demodulates the transmitted carrier bearing the digital data signal. The modem modulates a carrier with the digital pulses and converts them into an A.C. representation using frequency shift keying. A 1,200 hertz frequency is usually employed to transmit a "mark" and a 2,200 hertz frequency is employed to transmit a "space." Such transmission may be synchronous or asynchronous. In the present invention, asynchronous, or start-stop transmission is employed, wherein one character is sent at a time, although similar techniques could be applied to synchronous transmission. The character is initialized by a "start" signal in the form of a "space" condition, and terminated by a "stop" signal in the form of a "mark" condition. In the present invention, a logic one voltage level is provided at the output when a "mark" signal frequency of 1,200 hertz is received, and a logic zero voltage level is present at the output upon receipt of a "space" signal frequency of 2,200 hertz.

The present invention provides a carrier detection circuit to detect the transmission of carrier frequencies on the transmission line from a remote data set. There is a delay, typically 50 milliseconds, before such circuits can distinguish the presence of carrier frequencies in the presence of a high noise level on the transmission line. Some of the delay is due to the employment heretofore of the same broad band circuitry to detect the turn-on and turn-off of the carrier frequencies, since broad band circuits have a relatively low signal to noise ratio. The low signal to noise ratio requires that the detection of the carrier be delayed until the presence of the signal can be substantiated by being detected over the noise for a period of time.

In the present invention, the time necessary for detection of a carrier signal is reduced considerably, thereby substantially increasing operating speed. The increased operating speed without an attendant increased susceptibility to noise is primarily due to the provision of a circuit receptive to the low frequency, relatively high energy mark signals provided at the beginning of the carrier. These signals have a relatively high signal to noise ratio, thereby enabling fast reliable detection of a carrier. The narrow band of detection avoids false turn-ons due to noise. After detection of a carrier, the higher frequency, and usually lower energy space signals are present as well as the mark frequency during the duration of the message. To quickly detect the turn-off of the carrier while decreasing susceptibility to noise, a novel carrier detection circuit is disclosed.

Since carrier detect and turn-on detection can take place with each transmitted character in the case of short messages, it will be readily apparent that a substantial saving of time for detection of the beginning and end-of-transmission of a character enables closer spacing of characters and faster operation, particularly in the presence of noise. Typically in the present invention, the carrier detect and turn-on of the gate passing the data to the utilization apparatus may be less than 10 milliseconds. The same delay time is employed to reduce frequency of turn-offs due to noise received during the message. Noise turn-offs may be reduced to less than one-half those normally found with one type of turn-off and may be reduced to zero by the use of an EOT signal.

The present invention makes it possible to employ the conventional broad band predetector circuits of the data channels of the receiver if it can be narrowed prior to carrier detection, or to employ a separate mark frequency detector while achieving good operation in a noisy environment and providing adequate response times in a practical system. A carrier detect flip-flop is latched upon reception of the high energy initial mark signals that always occur at the beginning of the message, and a suitable turn-off signal is generated to reduce the probability of a turn-off by noise during the message. Turn-off signals due to noise or loss of carrier are filtered or delayed or inhibited by the receiver signals whereby normal turn-off is rapid, but spurious turn-offs are reduced. A message end code can cause rapid turn-off if it is transmitted and spurious turn-offs are to be avoided as completely as possible. A "mark" in the received signal must be available before fast turn-offs are allowed, thereby reducing the probability of turn-off due to noise. (It is conventional to enable the FSK receiver to be in the mark state at the cessation of carrier, thereby assuring a turn-off at the end of message).

BRIEF DESCRIPTION OF THE DRAWING

The sole FIGURE illustrates an embodiment of the carrier detection apparatus of the present invention.

DESCRIPTION OF THE INVENTION

The apparatus illustrated in FIG. 1 includes a conventional frequency shift keying receiver 11 connected to the output terminal of a data band filter 12. The output of the frequency shift keying receiver 11 is connected to an AND gate 13. The output signal from the frequency shift keying receiver 11, designated as $R_d$ in FIG. 1, is in the form of a DC voltage compatible with computer electronics. Exemplarily, zero level DC level output signifies a space and a plus 5 volt DC level indicates a mark or one. The portion of the voice band containing the FSK signal is selected by a band pass filter 10. The filtered signal is then applied to envelope detector 14 and low pass filter 15. If a signal is being received, the output of envelope detector 14 is in the form of a positive voltage level proportional to the energy in the mark and space signals. These variations are eliminated by low pass filter 15, and a nominal DC voltage is applied to one input of AND gate 16, as long as an FSK signal is being received. When a signal is in the process of being received, the inverted end-of-transmission signal, $\overline{EOT}'$ is applied to the other input of AND gate 16. It will be apparent, therefore, that upon receipt of a signal, a positive voltage will be applied to AND gate 16, providing a positive output, thereby turning on carrier detect latch circuit, or flip-flop 17. However, if a signal within the data band is not being received, a burst of noise present within the data band will not turn on carrier detect latch circuit 17 due to the selectivity of the band pass filter 10 and the delay inherent in low pass filter 15. However, the response time of low pass filter 15 and the threshold of carrier detect flip-flop 17 are such that the flip-flop turns on rapidly in the presence of normal high energy mark signals. The response times and thresholds are such that unwanted noise signals cause turn-on of carrier detect flip-flop 17 infrequently enough for good system operation.

After carrier detect flip-flop 17 has been turned on, an inverter 21, an integrating delay 22 and the carrier detect flip-flop 17 "off" logic is employed to permit rapid turn-off of the carrier detect flip-flop 17 after normal end-of-transmission codes, if desired, and also to permit delayed turn-off in the event signal energy drops normally at the end of a message. A short signal drop-out can turn off the carrier detect flip-flop 17 only if it lasts long enough to get through the integrating delay circuit 22, and, if the $R_d$ signal from the FSK receiver 11 is in a marking condition. When an end-of-transmission turn off signal is received, the inverted end-of-transmission signal is applied to AND gate 23, while the delayed inverted signal from integrating delay 22 is applied to AND gate 24. The delay provided by integrating delay 22 reduces the probability of impulse noise causing the turning off of carrier detect flip-flop 17 beyond that resulting from the response of post detection low pass filter 15 alone. The use of the positive "mark" signal, inverted by inverter 25 and delayed by delay line 26, on the input of turn-off AND gate 24 further reduces the probability of turn-off due to noise. Only those noise signals large enough to cause a carrier detect failure during the presence of mark energy will turn CD off.

Since, in any message, marks are present statistically only half the time, $R_d$ will allow the "off signal" through AND gate 24 only when marks are present. Therefore, only half the turn-off signals which are due to noise can reach the input of off gate 24 to cause misoperation.

The delays provided by low pass filter 15 and delay integrater 22 are approximately 10 milliseconds each. It is also to be noted that the mark signal at 1,200 hertz contains considerably more energy than the space signal at 2,200 hertz due to the characteristics of unconditioned voice frequency telephone lines. The output $R_d$ from frequency shift keying receiver 11 is also delayed in delay line 26 when the average energy present in the character is low, as when the character includes numerous spaces. The delayed $R_d$ signal is mostly negative. Therefore, it will be seen that, when the transmitted characters include a large number of space frequency transmissions, signal energy is low and noise most easily overcomes the signal. However, the delayed inverted output of $R_d$ applied to gate 24 prevents turn-off of carrier detect flip-flop 17 unless the FSK receiver is detecting marks. When numerous marks are transmitted, the signal is stronger. The signal to noise ratio is thereby better, and the voltage applied to AND gate 24 is considerably lower, thus allowing fast turn-off, and turn offs are allowed only when the signal to noise is high. If the carrier should drop out before the end-of-transmission signal is received, the delay line operates because of the received inverted delayed signal applied to gate 24. This enables a fast turn-off at the end of the message, where the signal goes to the mark position for the last stop bit. In an asynchronous communication system there is an unconditional stop, or mark, bit for every character. A special fast turn-off may be accomplished by applying the output of delay line 26, serving to screen out spurious off signals due to noise, and the output of inverter 21 to AND gate 23. It will be noted that the turn-off gate 24 is activated and causes CD to go off only when EDT fails to appear and when the carrier level has decreased.

The carrier detect voltage, CD, from carrier detect flip-flop 17, in addition to turning on gate 13, is applied to gates 23 and 24 after being delayed by delay line 27. The delayed CD voltage applied to gates 23 and 24 prevents application of an off signal to flip-flop 17 due to bursts of noise during short periods of carrier drop-out.

What is claimed is:

1. A modem having a frequency shift keying receiver and a carrier detection circuit, said carrier detection circuit comprising:
 - a carrier detect latch circuit;
 - turn-on means for turning said carrier detect latch circuit on in response to mark signals;
 - first turn-off means for turning said carrier detect latch circuit off in response to an end-of-transmission code;
 - second turn-off means for turning said carrier detect latch circuit off in response to a long signal drop-out; and
 - noise turn-off reduction means connected to said first and second turn-off means for preventing transmission line noise from turning off said carrier detect latch circuit.

2. In the carrier detection circuit of claim 1, said carrier detect latch circuit including a flip-flop having an on terminal, an off terminal, and an output terminal.

3. In the carrier detection circuit of claim 1, a signal gate having a first input terminal connected to a frequency shift keying receiver and a second input terminal connected to the output of said carrier detect latch circuit whereby signals are passed by said signal gate only when said carrier detect latch circuit is on.

4. In the carrier detection circuit of claim 1, said turn-on means including;
 - an envelope detector and low pass filter means responsive to received voice band signals;

a turn-on gate having a first input connected to said low pass filter and a second input responsive to an inverse end-of-transmission signal, whereby said turn-on gate passes a signal turning on said carrier detector latch in response to a received signal.

5. In the carrier detection circuit of claim 4, said first turn-off means including:

a first inverter and a delay integrator connected to the output of said low pass filter;

a second inverter and a first delay line connected to the output of said frequency shift key receiver;

a second delay line connected to the output of said carrier detection latch; and a first off gate having inputs connected to said delay integrator, to said first delay line and to said second delay line, and an output connected to the off terminal of said carrier detection latch.

6. In the carrier detection circuit of claim 5, said second turn-off means including:

a second off gate including a first input terminal connected to the output of said first inverter, a second input terminal connected to the output of said second delay line, and a third input terminal responsive to the end-of-transmission code, and an output terminal connected in circuit with the off terminal of said carrier detect latch circuit.

7. In a carrier detection circuit for use in connection with a frequency shift keying receiver, the combination of:

a carrier detect latch circuit;

a turn-on gate having a first input responsive to received mark signal levels, a second input responsive to inverted end-of-transmission signals and an output terminal in circuit with said carrier detect latch circuit to turn on said carrier detect latch circuit;

a first turn-off gate having inputs responsive to the inverted, delayed output of said frequency shift keying receiver, to the inverted, integrated mark signal level, and to the carrier detect on signal, and having an output terminal connected to turn off said carrier detect latch circuit;

a second turn-off gate having inputs responsive to the inverted mark signal level, to the carrier detect on signal, and to the end-of-transmission code signal; and, an output terminal connected to turn off said carrier detect latch circuit.

8. In the carrier detection circuit of claim 7, said carrier detect latch circuit including:

a bi-stable flip-flop circuit having an on terminal, an off terminal, and an output terminal; and, a gate circuit having a first input connected to the output of said frequency shift keying receiver, a second input connected to said output terminal of said flip-flop circuit, and an output terminal.

9. In the carrier detection circuit of claim 8, said first input of said turn-on gate being connected in circuit with an envelope detector and a low pass filter.

10. In the carrier detection circuit of claim 9, said first turn-off gate including:

a first input in circuit with the output of said frequency shift keying receiver;

a second input in circuit with said first input of said turn on gate, an inverter and a delay integrator;

a third input in circuit with the output of said flip-flop circuit and a delay circuit; and, an output terminal connected in circuit with the off terminal of said flip-flop circuit.

11. In the carrier detection circuit of claim 10, said second turn-off gate including:

a first input in circuit with the output of said flip-flop circuit and a delay circuit;

a second input in circuit with said first input of said turn-off gate and an inverter;

a third input responsive to an end-of-transmission signal; and, an output terminal connected in circuit with the off terminal of said flip-flop circuit.

* * * * *